Figure 1:
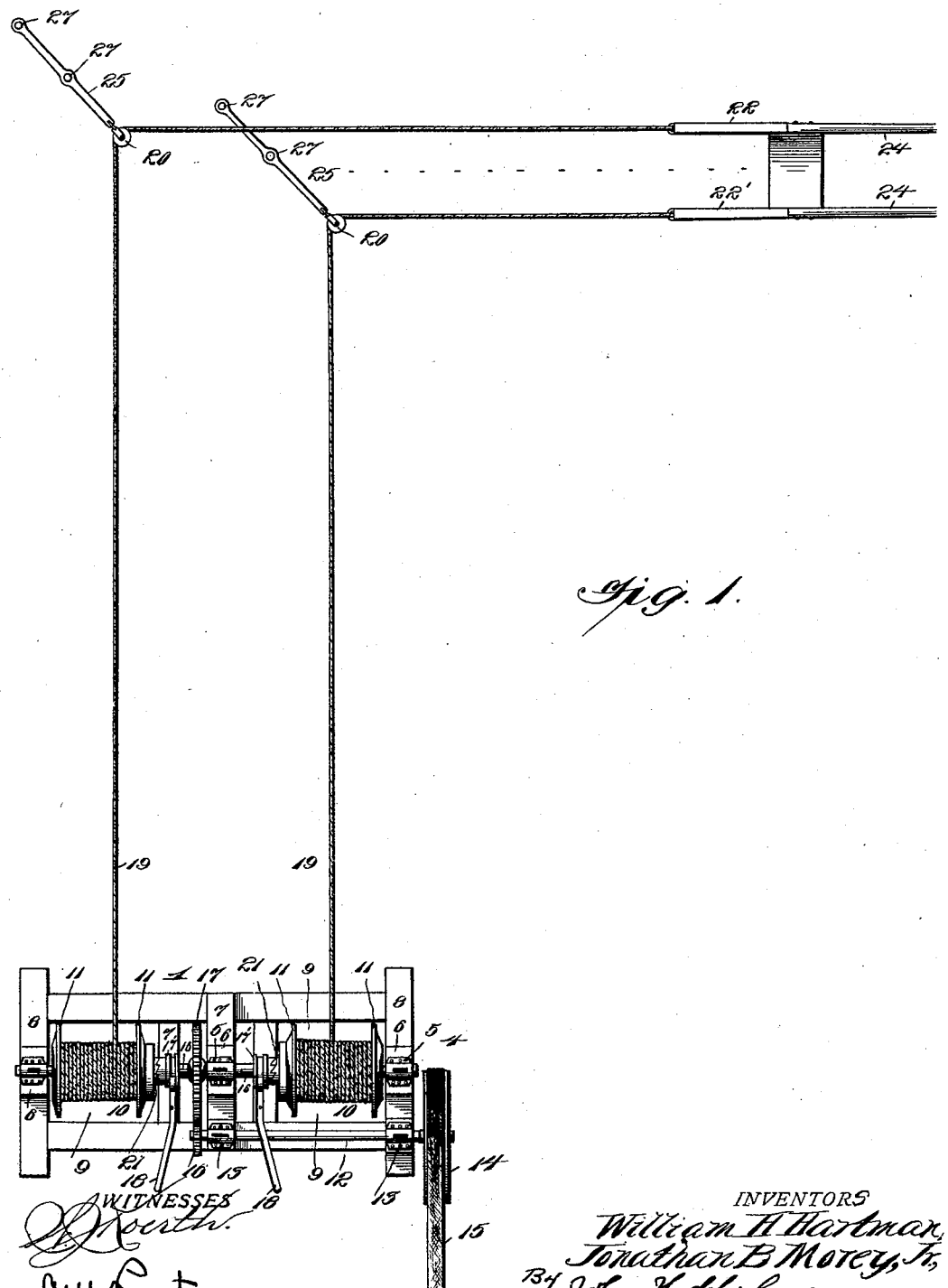

(No Model.) 2 Sheets—Sheet 1.
W. H. HARTMAN & J. B. MOREY, Jr.
TREE DIGGER.
No. 594,689. Patented Nov. 30, 1897.

WITNESSES

INVENTORS
William H. Hartman,
Jonathan B. Morey, Jr.,
By John Hedderwick Attorney (No Model.) 2 Sheets—Sheet 2.
W. H. HARTMAN & J. B. MOREY, Jr.
TREE DIGGER.
No. 594,689. Patented Nov. 30, 1897.
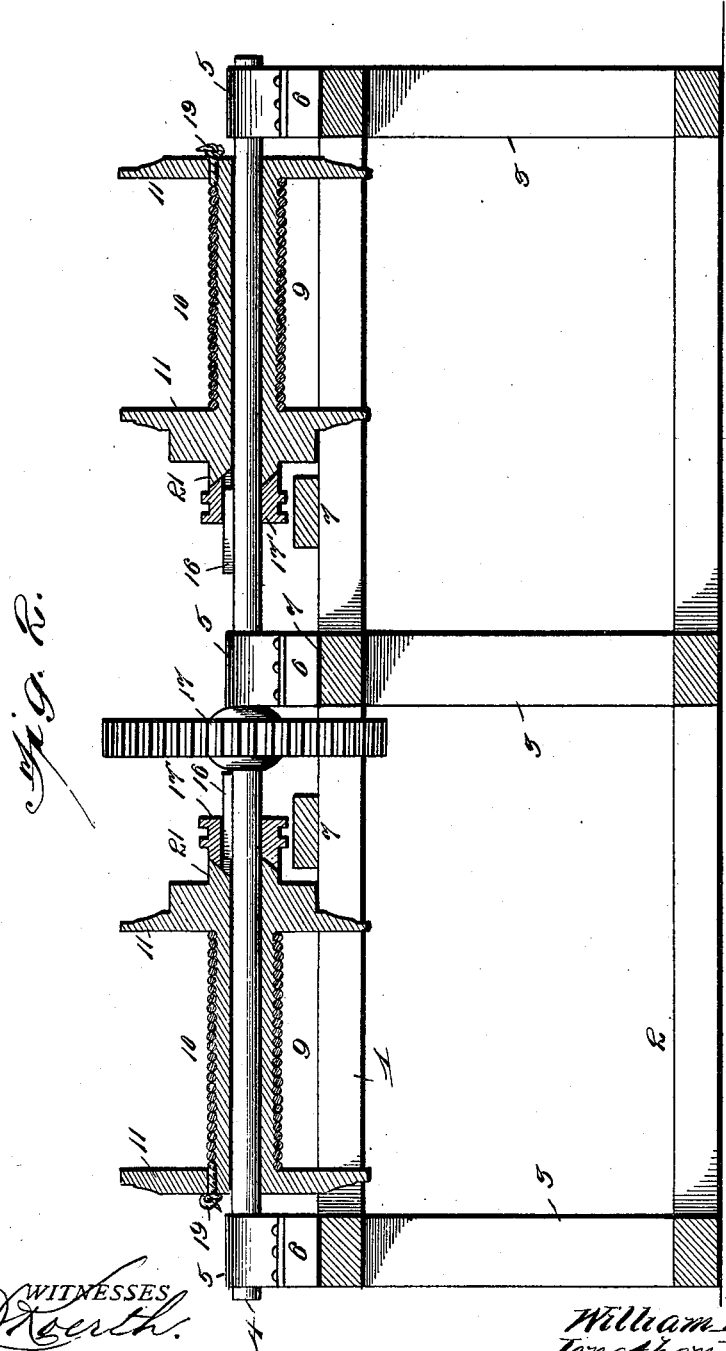
WITNESSES
INVENTORS
William H. Hartman,
Jonathan B. Morey, Jr.,
By John Hedderbeck
Attorney

UNITED STATES PATENT OFFICE.

WILLIAM H. HARTMAN AND JONATHAN B. MOREY, JR., OF DANSVILLE, NEW YORK.

TREE-DIGGER.

SPECIFICATION forming part of Letters Patent No. 594,689, dated November 30, 1897.

Application filed March 22, 1897. Serial No. 628,597. (No model.)

*To all whom it may concern:*

Be it known that we, WILLIAM H. HARTMAN and JONATHAN B. MOREY, Jr., citizens of the United States, residing at Dansville, in the county of Livingston and State of New York, have invented certain new and useful Improvements in Tree-Diggers; and we do hereby declare the following to be full, clear, and exact description of the invention, such as will enable others skilled in the art to which it appertains to make and use the same.

Our invention relates to a device for digging trees, and has special reference to a machine for use in nurseries where trees are planted in rows and where it is desired to remove the same when they are of sufficient size for planting out without injury to the trees themselves or to the adjacent rows. We accomplish this result by a machine constructed as hereinafter set forth, claimed, and illustrated by the accompanying drawings, in which—

Figure 1 is a top plan view of our machine in operative position. Fig. 2 is a longitudinal vertical section of the same, taken on the line $x\ x$ of Fig. 1.

The framework of the machine consists of the upper and lower frames 1 and 2, respectively, connected by uprights 3. Journaled upon the upper frame 1 is the main shaft 4, which extends longitudinally through the frame and has the journaled boxes 5, supported upon the blocks 6. Cross-pieces 7 are secured to the upper frame 1 and form between them and the end cross-piece 8 the space 9, in which the rope-receiving drums 10 are adapted to rotate. These drums 10 are loose upon the main shaft 4 and are provided with flanges 11 for the purpose of preventing the rope being wound thereupon slipping off the same. The short shaft 12 is also journaled in boxes 13 upon the upper frame 1, said shaft provided on its outer end, on the outside of the frame, with a driving-pulley 14, which is driven by a steam-engine or other suitable power through the medium of the belt 15. On the opposite end of this short shaft is the pinion 16, which intermeshes with the gear-wheel 17, keyed to the main shaft 4, whereby motion is imparted to said shaft, as will be understood.

For locking the drums to the shaft we provide the shaft with the feathers 16, upon which the clutches 17' are adapted to slide. For moving the clutches the levers 18 are provided, which are pivoted to the frame of the machine and engage the clutches at their inner ends. Any form of clutch may be used, as desired, as the same forms no part of our invention.

The outer flange of each drum is perforated, and through this perforation a rope 19 is passed and its end knotted to prevent disengagement therefrom. These ropes 19 are extended at right angles to the row of trees being operated upon and are passed around pulleys 20 and then extended along the line of trees, one rope on either side of the same. The ends of these ropes are attached to the beams 22 and 22' of the tree digger or plow, which consists of a suitable curved steel blade. This plow or digger is provided with handles 24 in line with the beams for the purpose of steering or guiding the digger by a person at each of said handles. The pulleys 20 are provided with the links 25, through which the stakes 27 are driven for securing the same to the ground.

The mode of operating our machine for digging trees is as follows: One man walks on each side of the row of trees to be dug, each man guiding one handle of the plow or digger, as before stated. These men each carry a small flag, one red and the other white, and the operating-levers 18 of the machine are each provided with a similar flag. A person is also positioned at the turning-point of the ropes, where they pass over the pulleys 20, and he also carries similar flags. Now as the digger is being pulled under the row of trees by the winding of the ropes 19 upon the drum it has a tendency to depart from a straight line, owing to its striking a stone or other substance or one rope stretching more than the other, and the digger or plow thus diverted from its straight course is liable to endanger the trees before it can be turned back into the proper course. When the plow from any of the above-enumerated causes moves to one side, the operator on that side signals with his flag to the operator at the end of the row of trees, and the latter in turn communicates the signal to the operator at the machine by using either a red or white flag to denote which drum should be stopped in order to bring the plow into the proper position. The levers for operating the respective clutches being marked by flags of different colors it will be understood that it is very easy to indicate to the machine-operator which drum is to be stopped by simply signaling with the proper flag.

From the construction above enumerated it will be understood that either or both drums may be instantly rotated by a movement of the clutch-controlling levers or its rotation stopped by a reverse movement of the said levers.

We have produced a machine for the purpose of digging or removing trees from nurseries which accomplishes its work in a manner far more satisfactory than by using horses and which prevents any injury to the trees by the plow or digger being diverted from its course.

Having thus fully described our invention, what we claim as new, and desire to secure by Letters Patent, is—

1. In a device of the character described, the combination with a digging device, ropes connected thereto and extending on opposite sides of the trees operated upon, drums upon which the ropes are adapted to be wound, a driving mechanism for rotating said drums, and means for controlling the rotation of the drums so that they may be operated independently of each other, substantially as described.

2. In a device of the character described, the combination of a digging device, ropes connected thereto and extending on opposite sides of the trees operated upon, a shaft, a mechanism for rotating said shaft, drums loose upon said shaft, said ropes adapted to be wound upon the drums, and means for independently moving the drums to engage the shaft, substantially a described.

3. In a device of the character described, the combination of a digging device, ropes attached thereto and extending on opposite sides of the trees to be operated upon, pulleys suitably supported over which said ropes pass and are turned at right angles to the row of trees, drums to which the opposite ends of the ropes are attached, mechanism for rotating said drums, and means for independently controlling the rotation of the drums, substantially as described.

In testimony whereof we have signed this specification in the presence of two subscribing witnesses.

WILLIAM H. HARTMAN.
JONATHAN B. MOREY, Jr.

Witnesses:
ELIZABETH BURGESS,
ALBERT J. GILMAN.